UNITED STATES PATENT OFFICE.

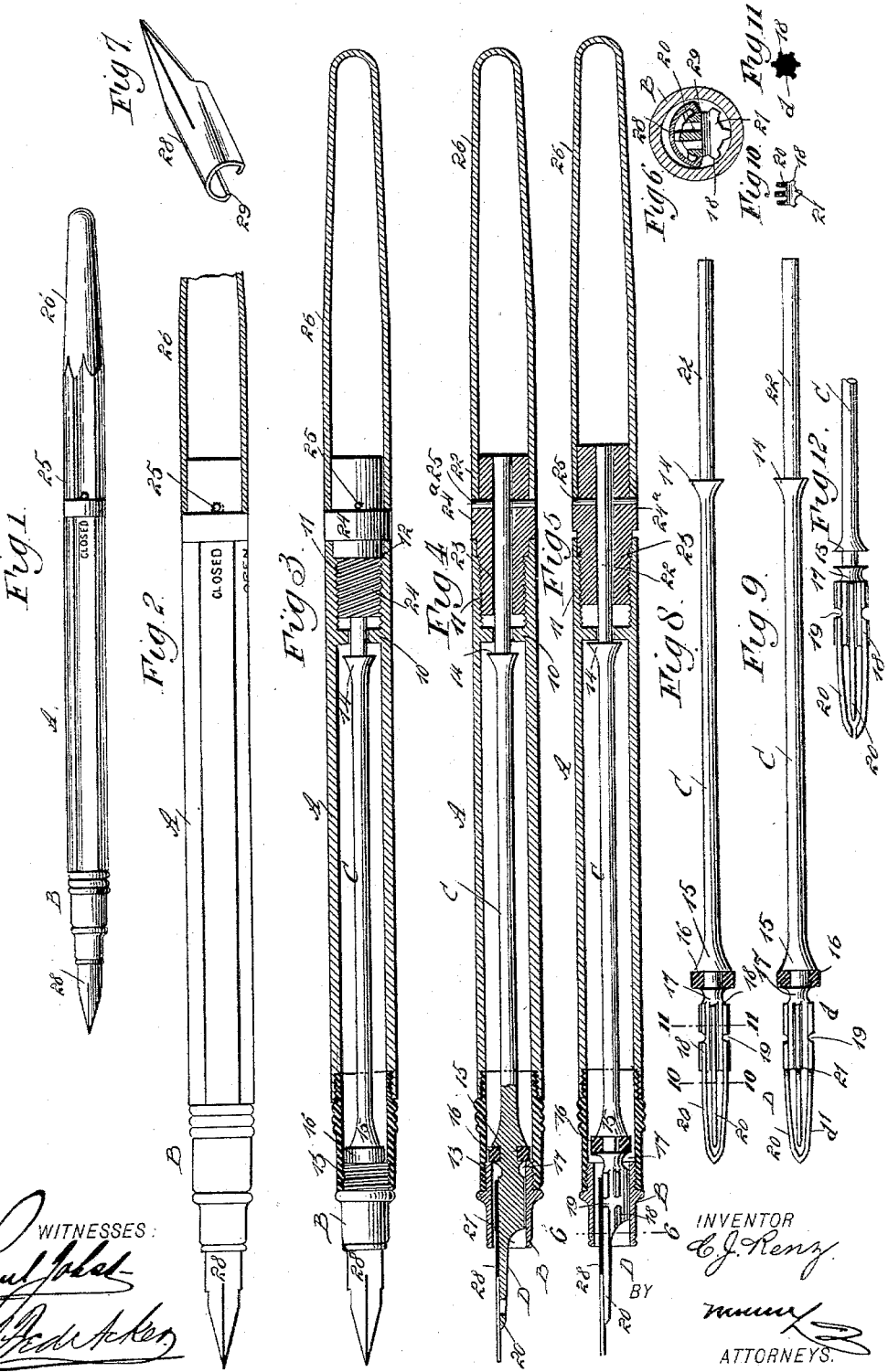

CARL J. RENZ, OF NEW YORK, N. Y.

FOUNTAIN-PEN.

SPECIFICATION forming part of Letters Patent No. 597,742, dated January 25, 1898.

Application filed February 19, 1897. Serial No. 624,181. (No model.)

*To all whom it may concern:*

Be it known that I, CARL J. RENZ, of New York city, in the county and State of New York, have invented a new and Improved Fountain-Pen, of which the following is a full, clear, and exact description.

The object of the invention is to construct a fountain-pen in a simple and economic manner and to provide for the control of the ink from the barrel to the pen by a slight movement only of a controlling valve or stem and to locate the valve which opens and closes the barrel close to the feeder and to form the feeder continuous with the controlling valve or stem.

A further object of the invention is to place the feeder loosely in the barrel top or nozzle, which arrangement not only allows of a more free circulation of air than ordinarily, but also provides room for a gentle vibration of the feeder through the whole length of the barrel, as the stem connected with the feeder extends the length of the barrel. Thus when the pen is in use a greater flow of ink is obtained in rapid writing, because the vibration will be stronger and a lessened flow of ink will be secured in slow writing by reason of the vibration being weaker.

Another object of the invention is to so construct the feeder that it will be perfect in its conduct of the ink to the pen and to so construct the pen that it may be expeditiously and conveniently placed in position on the feeder or detached therefrom.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of the improved pen. Fig. 2 is a plan view of the pen on an enlarged scale, a portion of the cap being broken away. Fig. 3 is a horizontal section through the barrel of the pen and through the cap. Fig. 4 is a vertical section through the entire pen, the parts being in position to prevent the flow of ink from the barrel to the pen. Fig. 5 is a section similar to that shown in Fig. 4, the valve being open and the feeder being shown in side elevation. Fig. 6 is a section on the line 6 6 of Fig. 5. Fig. 7 is a perspective view of the pen. Fig. 8 is a plan view of the controlling or valve stem and feeder, the valve being in section. Fig. 9 is a bottom plan view of the controlling or valve stem and feeder, the valve being in section. Fig. 10 is a section on the line 10 10 of Fig. 8. Fig. 11 is a section on the line 11 11 of Fig. 8, and Fig. 12 is a plan view of a slightly-modified form of feeder.

The barrel A may be of any desired shape or dimensions, and near its upper end is provided with a partition 10, having an opening therein. The barrel is further provided between its upper end and the partition with an interior thread 11, constructed of multiple spirals, and a shoulder 12 at its upper end, formed by increasing the interior diameter of the barrel at that point, the wall being smooth, and the barrel at its lower or outlet end is provided also with an ordinary interior thread 13.

A nozzle or a tip B is screwed into the lower end of the barrel, as shown in Figs. 3, 4, and 5. Within the barrel a controlling or valve stem C is located. This stem extends the full length of the barrel. The stem is provided with a head 14 near its upper end adapted to engage with the inner surface of the partition 10, as shown in Figs. 3, 4, and 5. An enlargement 15 is made near the lower end of the controlling or valve stem, in which enlargement an annular groove is made to receive a packing or a gasket 16, the stem constituting a valve, being adapted to seat itself on the inner end of the nozzle or tip B, as shown in Fig. 4.

The feeder D is integral with or constitutes a continuation of the controlling or valve stem C. The feeder consists of a body *d* and a tine-section *d'*. Adjacent to the valve 16 an annular groove 17 is made in the body of the feeder, as shown particularly in Figs. 8, 9, and 12, and in the said body also a number of longitudinal grooves are made, forming ribs 18. These grooves and ribs extend entirely around the body. A circumferential groove 19 is also made in the body about centrally between its ends, which groove may be carried through all of the ribs or through sundry of them, as may be found desirable.

The tine-section of the feeder consists of two or more fingers 20, usually three, and these fingers are continuations of the upper ribs 18 of the body of the feeder. The tines may all be separated at their outer ends, as shown, for example, in Fig. 12; or, as illustrated in Figs. 8 and 9, the outer tines may be connected, but the inner tine will be free at its outer end. The feeder has normally a slight upward curve at its tine-section when the pen is not in position on the feeder. The tine-section of the feeder is much thinner than the body-section, whereby preferably a curved shoulder 21 is formed on the under face of the feeder, as shown particularly in Fig. 4.

The upper end 22 of the controlling or valve stem C is of sufficient length to extend beyond the upper end of the barrel and is made to enter a regulating-plug 23. This plug is provided with an exterior multiple spiral thread 24, adapted to enter the thread 11 in the barrel. The plug at or near its center has a collar 24$^a$ formed thereon, which when the plug is in position in the barrel will extend to the exterior face thereof, as shown in Figs. 3, 4, and 5. The upper end 22 of the controlling or valve stem is secured to the plug in any suitable or approved manner—as, for example, through the medium of a pin 25, passed through the regulating-nut above the collar 24$^a$—and the upper outer end of the controlling or valve stem will be cut off flush with the corresponding end of the regulating-plug. The regulating-nut is preferably turned through the medium of a cap 26, adapted when the pen is not in use to cover the nib of the pen. This cap is provided with suitable recesses in its open end to receive the projecting portion of the pin 25 of the regulating-nut, which pin extends beyond an outer face of the nut. Therefore by turning the cap the regulating-nut will be turned in a corresponding direction.

The pen 28 is provided with side flanges 29 at the bottom edges of its body, which flanges extend inward or in direction of each other, as shown in Fig. 7, so that the pen may be readily slid over the feeder and its flanges will engage with opposing ribs on the body portion of said feeder. The grooves between the ribs of the feeder admit a free circulation of air and the cross-groove 19 serves as a channel, facilitating the flow of ink in the grooves between the ribs to the point or nib of the pen.

I am aware that there are many patents and improvements on fountain-pens consisting of certain rods or stems inside of the barrel, which are manipulated from the upper end of the barrel by means of a screw to diminish or shut off the flow of ink; but these rods or stems are separated from the feeder and pen, which are fitted stationarily into a nozzle or tip. My improvement has these distinctions over such constructions: First, the feeder to which the pen is attached is not stationary, but revolves in a tube, this arrangement allowing not only a more free circulation of air, but giving room for a gentle vibration of the feeder through the whole length of the barrel when the pen is in use, causing thereby a greater flow of ink in rapid writing because the vibration is stronger and a lesser flow of ink in slow writing because the vibration is weaker; second, the valve by means of which the flow of ink is regulated is attached directly to the feeder itself, whereby the mechanical parts in the construction of the pen are lessened, and especially a more direct action of the valve in shutting off the ink-duct is assured; third, the valve for regulating the flow of ink is placed close to the pen proper, which has the advantage that when the ink-duct is shut no more ink will remain than the top of the feeder can safely carry without blotting, so that the pen when closed can be carried point down without any danger of leakage; fourth, the tip or point section of the feeder with the pen attached thereto is moved outward from its tube when the ink-duct is closed, thereby giving more space for the remaining ink, which then will adhere to the pen so tenaciously that the ink can hardly be shaken off; fifth, the top or tine section of the feeder with the pen attached is drawn inward into its tube when the air-duct is opened, thereby reducing the space inside of the tube, by which action the ink is forced into the tip of the pen, which then is ready for use.

It is obvious that by a slight rotary movement of the regulator-plug the valve 16 may be seated or unseated, and on the exterior of the barrel the words "Closed" and "Open" are usually produced as a guide for the operator. When the exposed end of the pen is opposite the word "Closed," the operator may be assured that the valve has been seated, and when the same lug is opposite the word "Open" the operator will know that the valve has been fully opened. It will be understood that the pen may be used to advantage, even when the indicating-lug 25 is between the points "Open" and "Closed."

Having thus described my invention, I claim as new and desire to secure by Letters Patent—

1. In a fountain-pen, a barrel, a controlling-stem held to turn in the barrel, a plug having threaded connection with the barrel and attached to said stem, a nozzle attached to the barrel at the end opposite its connection with the plug, a feeder carried by the stem and held to turn in the nozzle, being also capable of end movement therein, and a valve formed upon the stem, adjacent to the body of the feeder and adapted to be seated on the inner end of said nozzle, as and for the purpose set forth.

2. In a fountain-pen, the combination, with a barrel provided with an apertured partition near its upper end, and a nozzle on the lower end of the barrel, of a controlling-stem extending through the barrel and through the opening in its partition, the stem being provided with a head for engagement with the partition, a valve for engagement with the inner end of the nozzle, a feeder secured to the stem in advance of the valve, and a regulating-plug having screw connection with the barrel, said plug being secured to said stem, as and for the purpose set forth.

3. In a fountain-pen, the combination, with a barrel, of a regulating-rod loosely mounted in said barrel, provided at its upper end with a head limiting its end movement in one direction and at its lower end with a valve limiting its end movement in the opposite direction, a feeder forming a portion of the stem, and a regulating-plug secured in the end of the barrel, attached to the upper end of the said stem and arranged to impart an end movement to the stem, as and for the purpose specified.

4. In a fountain-pen, the combination, with a barrel having an apertured partition near its upper end, and a nozzle secured to the lower end of the barrel, of a feeder, a stem, to which the feeder is secured having its upper end reduced and projecting through the aperture of the partition of the barrel and provided with a head at the juncture of the reduced end with the body of the stem and a valve at its lower end adjacent to the feeder, a regulating-plug to which the stem is secured screwing into the upper end of the barrel and provided with a collar between its ends, and a cap engaging the outer end of the said plug, substantially as described.

5. A feeder for fountain-pens, consisting of a ribbed body, and fingers projected from the ribbed body, the said fingers being a continuation of sundry of the ribs, as and for the purpose specified.

6. A feeder for fountain-pens, consisting of a longitudinally-ribbed body provided with a circumferential groove crossing sundry of the ribs, and fingers projected from the upper portion of the body in an outwardly direction, as and for the purpose specified.

7. A feeder for fountain-pens, consisting of a solid cylindrical body provided with longitudinal ribs and a circumferential channel, and fingers projected from the upper portions of the body, as and for the purpose set forth.

8. A feeder for fountain-pens, consisting of a solid cylindrical body provided with longitudinal ribs and a circumferential channel, and fingers projected from the upper portion of the body, said fingers constituting continuations of the upper ribs of the body of the feeder, as and for the purpose set forth.

9. A feeder for fountain-pens, consisting of a solid cylindrical body having longitudinal ribs and fingers projected from the upper portion of the body, the fingers being in substantially parallel alinement, the outer fingers approaching one another and inclosing the intermediate finger, as and for the purpose specified.

CARL J. RENZ.

Witnesses:
J. FRED. ACKER,
JNO. M. RITTER.